(12) United States Patent
Suzuki

(10) Patent No.: US 9,425,724 B2
(45) Date of Patent: Aug. 23, 2016

(54) MOTOR ABNORMALITY DETECTION APPARATUS

(71) Applicant: DENSO CORPORATION, Kariya, Aichi-pref. (JP)

(72) Inventor: Ryo Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 82 days.

(21) Appl. No.: 14/536,768

(22) Filed: Nov. 10, 2014

(65) Prior Publication Data

US 2015/0171778 A1 Jun. 18, 2015

(30) Foreign Application Priority Data

Dec. 17, 2013 (JP) ................................. 2013-260442

(51) Int. Cl.
*H02P 23/12* (2006.01)
*H02P 6/14* (2016.01)
*H02P 3/02* (2006.01)

(52) U.S. Cl.
CPC ................ *H02P 6/142* (2013.01); *H02P 3/025* (2013.01); *H02P 29/0243* (2016.02)

(58) Field of Classification Search
CPC .............. B62D 5/0487; G06F 11/0796; H02P 29/0243
See application file for complete search history.

(56) References Cited

U.S. PATENT DOCUMENTS

2009/0114471 A1* 5/2009 Nagase ................ B62D 5/0487
180/446

FOREIGN PATENT DOCUMENTS

| JP | H08-172721 A | 7/1996 |
|----|--------------|--------|
| JP | 2000-166275 A | 6/2000 |
| JP | 3541675 B2 | 4/2004 |

* cited by examiner

*Primary Examiner* — Karen Masih
(74) *Attorney, Agent, or Firm* — Posz Law Group, PLC

(57) ABSTRACT

A MGECU includes a locked state check part for checking whether a motor generator is in a locked state, a current value check part for checking whether a current command value or an actual current value as a current value is in a predetermined disconnection undetectable range including a current value of zero, a phase shift part for shifting a phase of the current command value so that the current command value is outside the disconnection undetectable range with a direction of rotation being unchanged in a case that the motor generator is determined to be in the locked state and the current value is determined to be in the disconnection undetectable range, and an abnormality check part for checking whether the motor generator has a disconnection in windings based on a result produced by controlling the motor generator with a phase-shifted current command value.

7 Claims, 11 Drawing Sheets

_(2)_

MOTOR ABNORMALITY DETECTION APPARATUS

CROSS REFERENCE TO RELATED APPLICATION

This application is based on and incorporates herein by reference Japanese patent application No. 2013-260442 filed on Dec. 17, 2013.

FIELD

The present disclosure relates to a motor abnormality detection apparatus for detecting a disconnection of a winding of a motor, which is feedback-controlled based on a current command value and an actual current value.

BACKGROUND

Patent document, JP 3541675, discloses an apparatus for detecting a disconnection of a winding of a motor, which is feedback-controlled based on an actual value of a current flowing in a winding of the motor and a current command value required for the motor to generate a predetermined torque.

This apparatus includes an integration part, which integrates a difference between the current command value and the actual current value, and an abnormality detection part, which detects an abnormality when an output value of the integration part exceeds a predetermined value. When a disconnection arises in a motor of a three-phase AC type for example, the difference between the current command value and the actual current value consistently arises and the output value of the integration part continues to increase. It is possible for this reason to determine the disconnection of the winding based on the output value of the integration part exceeding the predetermined value.

According to the apparatus described above, however, there are some cases, in which the disconnection cannot be detected when the motor is in a locked state. In the locked state, the motor cannot rotate in spite of a torque command and hence a rotation speed of the motor is very low. For example, in a hybrid vehicle or an electric vehicle, the motor is in the locked state, in which the vehicle is not braked and is maintained not to descend backward by operating an accelerator.

Even when no disconnection is present, the difference between the current command value and the actual current value is very little near zero ampere (0 [A]). In the locked state described above, the rotation speed of the motor is very low and the actual current value remains near 0 [A] for a long period of time.

For this reason, the disconnection cannot be detected when the actual current value is near 0 [A] in the locked state. Particularly the disconnection cannot be speedily detected even when the disconnection arises.

SUMMARY

It is therefore an object to provide a motor abnormality detection apparatus, which is capable of detecting a disconnection of a winding in a locked-state of a motor.

According to one aspect, a motor abnormality detection apparatus is provided for detecting a disconnection of a winding of a motor, which is feedback-controlled based on a current command value required for the motor to generate a predetermined torque and an actual current value flowing to the winding of the motor. The motor abnormality detection apparatus comprises a locked state check part, a current value check part, a phase shift part and an abnormality check part.

The locked state check part checks whether the motor is in a locked state. The current value check part checks whether a current value, which is the current command value or the actual current value, is in a disconnection undetectable range including a current value of zero. The phase shift part shifts, when the motor is determined to be in the locked state and the current value is determined to be in the disconnection undetectable range, a phase of the current command value so that the current command value is outside the disconnection undetectable range with a direction of rotation of the motor being unchanged. The abnormality check part checks whether the winding of the motor has a disconnection based on a result of control of the motor with a phase-shifted current command value.

EMBODIMENT

Figure 1:
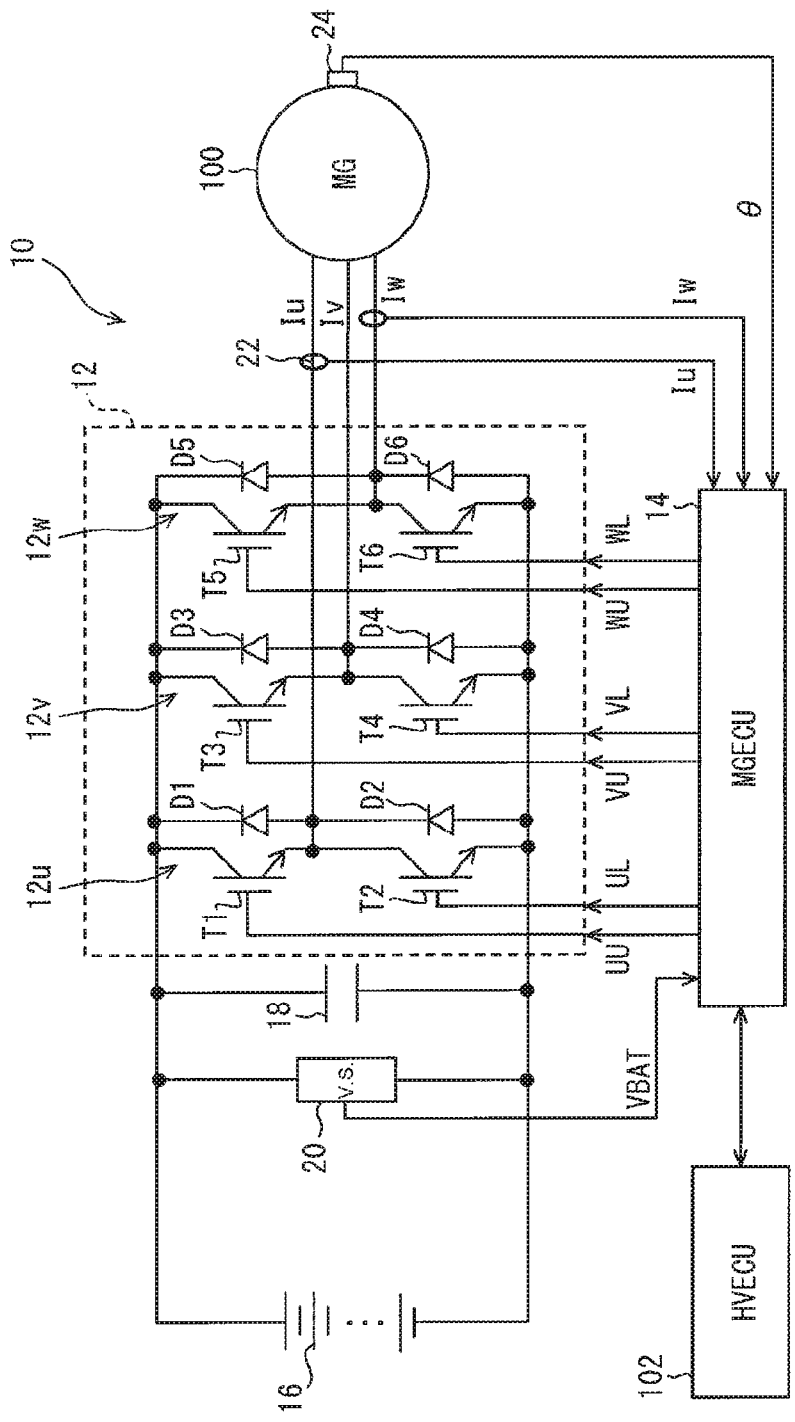
FIG. 1 is a circuit diagram showing a motor control system, to which a MGECU according to a first embodiment is applied.

A motor abnormality detection apparatus will be described in detail below with reference to various embodiments shown in the drawings. In each embodiment, common or corresponding parts are designated with same reference numerals.

First Embodiment

Referring first to FIG. 1, a motor control system, to which a MGECU (motor generator electronic control unit) is applied to control driving of a motor generator. The motor generator operates as a motor and a generator. As one function of the MGECU, an abnormality detection function is implemented.

As shown in FIG. 1, a motor control system 10, which controls a motor generator (MG) 100, includes an inverter 12, a MGECU 14, a DC battery 16, a smoothing capacitor 18, a voltage sensor 20, current sensors 22 and a rotation sensor 24. Although FIG. 1 shows only the battery 16 as a direct current power source, other voltage conversion devices such as a booster converter may be provided.

The motor generator 100 is formed of three phase coils of, for example, U-phase, V-phase and W-phase, and a rotor of permanent magnets. The motor generator 100 is coupled to a drive shaft of a vehicle through, for example, a planetary gear mechanism. The motor generator 100 functions as a motor, which generates a drive torque required by drive wheels, when a drive current is supplied by the inverter 12. The motor generator 100 also operates as a generator, which generates regenerative power, when a drive force is applied from the drive wheels and rotationally driven at time of deceleration of the vehicle.

The inverter 12 includes three phase arms 12u, 12v and 12w, which are connected in parallel one another between a high potential side line (power line) and a low potential side line (ground line) of the battery 16 provided as a direct current power source. Each of phase arms 12u, 12v and 12w is formed of two switching elements, which are connected in series between the high potential-side line and the low potential-side line, and a diode connected in parallel to each switching element.

Specifically, the U-phase arm 12u is formed of switching elements T1, T2 and diodes D1, D2. The V-phase arm 12v is formed of switching elements T3, T4 and diodes D3, D4. The W-phase arm 12w is formed of switching elements T5, T6 and diodes D5, D6. The switching element T1 to T6 each may be an IGBT, for example. A junction (middle point) between the switching elements in each phase arm 12u, 12v and 12w is connected to a stator coil of each phase of the motor generator 100.

For operating the motor generator 100 to function as a motor, a combination of the switching elements T1 to T6 of the inverter 12, which are turned on at the same time, are switched over in response to drive control signals UU, UL, VU, VL, WU and WL applied from the MGECU 14. Thus the current supply phase of the motor generator 100, to which the current is supplied from the battery 16, is switched over sequentially and a rotating magnetic field is generated to rotate the rotor.

The MGECU 14 outputs pulse-width modulation signals (PWM signals), which correspond to the drive torque to be generated by the motor generator 100, as the drive control signals UU, UL, VU, VL, WU and WL to the inverter 12. Thus, currents Iu, Iv and Iw of current values corresponding to the PWM signals are supplied to the stator coils, respectively, and the drive torque generated by the motor generator 100 is controlled in accordance with the current values. The PWM signals are generated based on detection signals of the current sensors 22, which detect the current values (referred to as actual current values below) of the stator coil of each phase.

The drive control signal UU is applied to a gate of the switching element T1, which is at the high potential side in the U-phase arm 12u. The drive control signal UL is applied to a gate of the switching element T2, which is at the low potential side in the U-phase arm 12u. Similarly, the drive control signal VU is applied to a gate of the switching element T3, which is at the high potential side in the V-phase arm 12v. The drive control signal VL is applied to a gate of the switching element T4, which is at the low potential side in the V-phase arm 12v. The drive control signal WU is applied to a gate of the switching element T5, which is at the high potential side in the W-phase arm 12w. The drive control signal WL is applied to a gate of the switching element T6, which is at the low potential side in the W-phase arm 12w.

For operating the motor generator 100 to function as the generator at the time of deceleration of the vehicle, the MGECU 14 controls the inverter 12 so that three-phase AC currents generated by the motor generator 100 are converted into a DC current. The DC current is used to charge the battery 16.

The MGECU 14 is formed of a microcomputer and includes at least a ROM, a CPU, a RAM and the like. The ROM stores programs defining various control processing, which are to be executed in the MGECU 14. The CPU executes various arithmetic processing. The RAM stores temporarily results of the arithmetic processing and various data.

The MGECU 14 receives a detection signal of the voltage sensor 20 for detecting a terminal voltage of the smoothing capacitor 18, detection signals of the current sensors 22 for detecting the actual current values and a detection signal of the rotation sensor 24 for detecting a rotational position of the motor generator 100.

The MGECU 14 generates the drive control signals UU, UL, VU, VL, WU and WL for driving the motor generator 100 based on a torque command value supplied from an external unit and the detection signals applied from the above-described sensors 20, 22 and 24. The MGECU 14 outputs these drive signals to the inverter 12. The switching elements T1 to T6 of the inverter 12 are driven in response to the drive control signals UU, UL, VU, VL, WU and WL so that the drive currents Iu, Iv and Iw are supplied from the battery 16 to the motor generator 100 through the inverter 12. Thus the motor generator 100 is driven to generate desired drive torque. The inverter 12 also rectifies the current of power generated by the motor generator 100 to charge the battery 16.

The voltage sensor 20 detects an inter-terminal voltage, that is, a battery voltage VBAT, of the smoothing capacitor 18 provided between the high potential side line and the low potential side line.

The current sensors 22 are formed of two sensors, which detect actual current values flowing in two stator coils (for example, U-phase and W-phase) among the three phases of the motor generator 100. The actual current value of one remaining phase is computed from the detected actual current values of two phases based on a relation that a sum of the three phase currents Iu, Iv and Iw is 0.

The rotation sensor 24 detects the rotation position (magnetic pole position) of the motor generator 100 as an absolute value like a resolver or an absolute-type encoder. The rotation sensor 24 detects the rotation position (rotor angle θ) of the motor generator 100 at every predetermined angular interval.

The MGECU 14 is connected to the HVECU 102 to be communicable each other. The HVECU 102 has a function of centrally controlling a drive system of the vehicle of a hybrid vehicle such as the motor generator 100, an engine and a generator, which are not shown, as well as a function of managing the battery 16.

The HVECU 102 computes a target torque from an operation of a driver on a vehicle (for example, accelerator position), a vehicle speed and the like and centrally controls the engine, the motor generator 100 and an AC generator to provide the target torque. That is, the HVECU 102 determines allocation of the target torque into a torque of the engine, a torque of the motor generator 100 and a torque of the AC generator.

Further, the HVECU 102 controls a throttle valve, which is not shown, to an appropriate opening position and controls a fuel injection amount and an ignition time so that the engine provides the required torque. In addition, the HVECU 102 controls a power control unit such as the inverter 12 so that the motor generator 100 and the AC generator provide the required torque. That is, the HVECU 102 transmits the torque command value to the MGECU 14 when necessary and receives data related to a motor operation state (for example, motor rotation speed and motor drive current value) when necessary. The HVECU 102 monitors a charge state of the battery 16 and controls charging and discharging of the battery 16.

Next, a general configuration of the MGECU 14 will be described with reference to FIG. 2.

Figure 2:
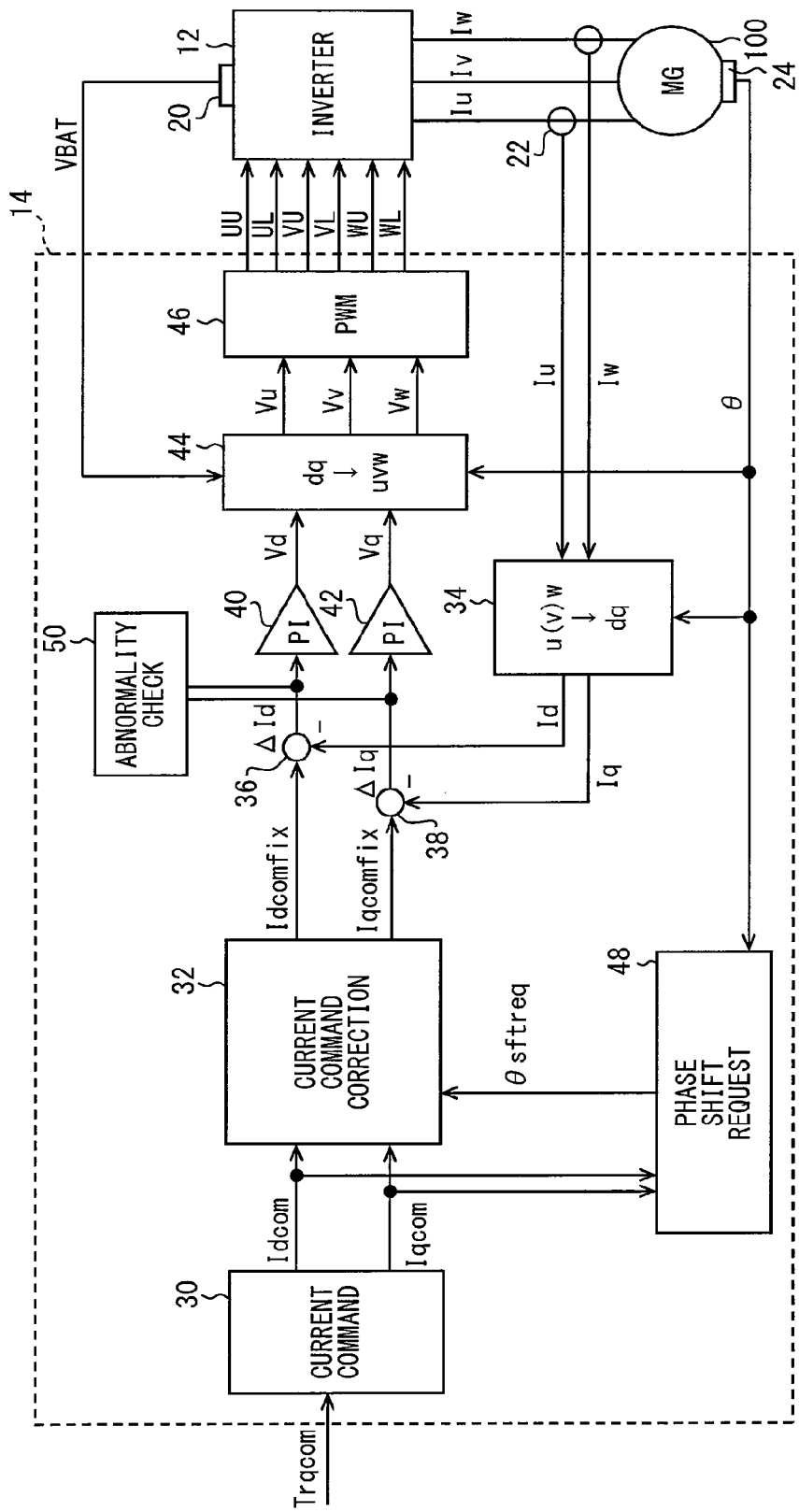
FIG. 2 is a block diagram showing the MGECU shown in FIG. 1.

As shown in FIG. 2, the MGECU 14 includes a current command generation part 30, a current command correction part 32, coordinate conversion parts 34, 44, subtraction parts 36, 38, proportional-and-integral (PI) control parts 40, 42, a PWM modulation part 46, a phase shift request part 48 and an abnormality check part 50. In the following description, as one example, the MGECU 14 is configured to vector-control the motor generator 100 of three-phase type. In vector control, an actual rotating coordinate defined by the U-phase, V-phase and W-phase is coordinate-converted to a d-q coordinate system, which is an imaginary rotating coordinate defined by a d-axis and a q-axis. The d-axis indicates a direction of magnetic flux provided by a magnetic pole of the rotor forming the motor generator 100. The q-axis is perpendicular to the d-axis. The motor generator 100 is controlled in the coordinate-converted d-q coordinate system. This vector control is known well and hence its description is simplified.

The current command generation part 30 computes current command values, which correspond to a torque command value Trqcom inputted from the HVECU 102. The current command values are specifically a d-axis current command value Idcom and a q-axis current command value Iqcom. The current command values Idcom and Iqcom are outputted to the current command correction part 32 and the phase shift request part 48.

The current command correction part 32 corrects (fixes) the current command values Idcom and Iqcom to shift the phases of the current command values Idcom and Iqcom, when a phase shift request θsftreq is inputted from the phase shift request part 48. A predetermined electrical angle (for example 15[°]) is stored in a memory, which is not shown, as a phase shift amount. When the phase shift request θsftreq is inputted, the phases of the current command values Idcom and Iqcom are shifted by an amount of the predetermined electrical angle. Corrected (fixed) current command values Idcomfix and Iqcomfix are outputted to corresponding subtraction parts 36 and 38, respectively. When the phase shift request θsftreq is not inputted, the current command values Idcom and Iqcom are not corrected and are outputted as the current command values Idcomfix and Iqcomfix.

The coordinate conversion part 34 converts the actual current value (for example, actual current values of U-phase current Iu and W-phase current Iw) detected by the current sensors 22 to values of the dq coordinate system by using the rotor angle θ detected by the rotation sensor 24 and computes the d-axis actual current value Id and the q-axis actual current value Iq. The d-axis actual current value Id and the q-axis actual current value Iq computed as described above are outputted to the subtraction parts 36 and 38, respectively.

The subtraction part 36 computes a d-axis difference ΔId, which is a difference between the d-axis current command value Idcomfix and the d-axis actual current value Id. The d-axis difference ΔId computed as described above is outputted to the PI control part 40 and the abnormality check part 50. The subtraction part 38 computes a q-axis difference ΔIq, which is a difference between the q-axis current command value Iqcomfix and the q-axis actual current value Iq. The q-axis difference ΔIq thus computed is outputted to the PI control part 42 and the abnormality check part 50.

The PI control part 40 computes a d-axis control voltage value Vd, which is a voltage value applied to the motor generator 100, based on the d-axis difference ΔId computed as described above so that the d-axis actual current Id follows the d-axis current command value Idcomfix. The d-axis control voltage value Vd computed as described above is outputted to the coordinate conversion part 44. The PI control part 42 computes a q-axis control voltage value Vq, which is a voltage value applied to the motor generator 100, based on the q-axis difference ΔIq computed as described above so that the q-axis actual current Iq follows the q-axis current command value Iqcomfix. The q-axis control voltage value Vq computed as described above is outputted to the coordinate conversion part 44. A control part for performing the feedback control is not limited to the PI control parts 40 and 42 but may be a control part, which performs only proportional (P) control or proportional-and-integral-and-derivative (PID) control.

The coordinate conversion part 44 converts the control voltages Vd and Vq to a U-phase voltage value Vu, a V-phase control voltage value Vv and W-phase control voltage value Vw of a three-phase AC coordinate system by using the rotation angle θ detected by the rotation sensor 24 and the battery voltage VBAT detected by the voltage sensor 20. The coordinate conversion part 44 then outputs the U-phase control voltage value Vu, the V-phase control voltage value Vv and the W-phase control voltage value Vw to the PWM conversion part 46.

The PWM modulation part 46 generates the drive control signals UU, UL, VU, VL, WU and WL, which correspond to the U-phase control voltage value Vu, the V-phase control voltage value Vv and the W-phase control voltage value Vw, and outputs the drive control voltages UU, UL, VU, VL, WU and WL to the inverter 12. Thus the currents Iu, Iv and Iw, which correspond to the drive control signals UU, UL, VU, VL, WU and WL, flow in each of the three phase coils of the motor generator 100 so that the motor generator 100 generates required torque.

The phase shift request part 48 has a function of checking whether the motor generator 100 is in the locked state, in which the motor generator 100 is incapable of rotation against the torque command, and a function of checking whether the current command value is in the predetermined disconnection undetectable range, which includes zero current value (0 [A]). The phase shift request part 48 outputs the phase shift request θsftreq to the current command correction part 32, when the motor generator 100 is in the locked state and any one of the current phases is in the disconnection undetectable range.

The phase shift request part 48 checks whether the motor generator 100 is in the locked state based on the rotor angle θ detected by the rotation sensor 24. The phase shift request part 48 checks whether the current command values Idcom and Iqcom generated by the current command generation part 30 are in the disconnection undetectable range.

The abnormality check part 50 checks whether the winding of the stator coil has a disconnection based on a result of controlling the motor generator 100 with the current command values Idcomfix and Iqcomfix, which are phase-shifted in response to the phase shift request θsftreq. The abnormality check part 50 checks whether the winding has a disconnection based on the d-axis difference ΔId and the q-axis difference ΔIq, which are computed by the subtraction parts 36 and 38, respectively.

Next, the abnormality check processing (disconnection detection processing), which the MGECU 14 executes, will be described with reference to FIG. 3 and FIG. 4. The abnormality detection processing is repetitively executed as long as the MGECU 14 is supplied with power.

The locked state of the motor generator 100 is a state, in which the motor generator 100 is incapable of rotation and the rotation speed of the motor generator 100 is very low even when the torque command is issued. For example, the locked state will arise when the vehicle is restricted from descending by operating the accelerator without using the brake in ascending a slope or when a tire wheel is caught in a groove.

The phase shift request part 48 of the MGECU 14 first acquires the rotor angle θ of the rotation sensor 24 and computes the rotation speed of the motor generator 100 based on the rotation angle θ. Then the part 48 checks whether the computed rotation speed is low, that is, less than a predetermined value, which is preset to determine the locked state (S10). This processing of S10 corresponds to a locked state check part. The predetermined value is for example 50 [rpm].

Figure 4:
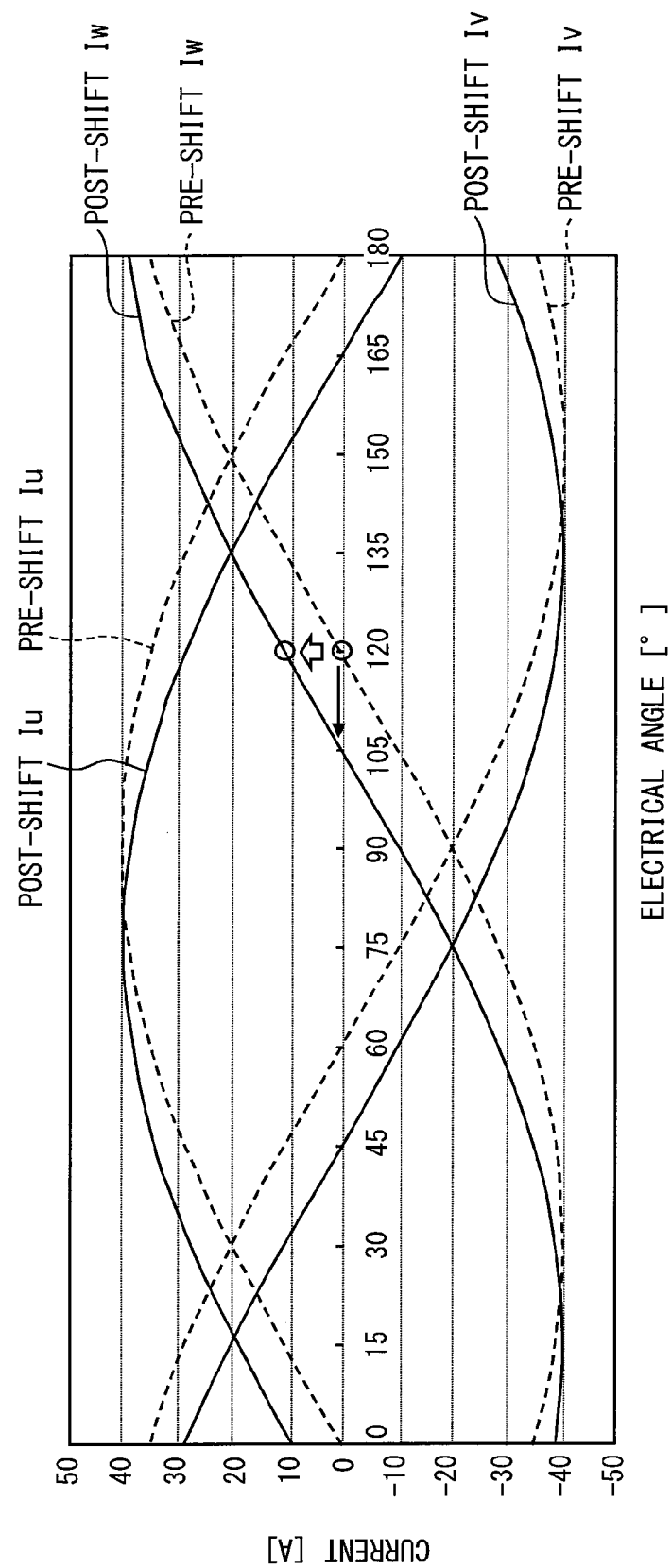
FIG. 4 is a chart showing a waveform of a current flowing to each coil before and after a phase shift.

FIG. 4 shows waveforms of the phase currents Iu, Iv and Iw, which flow in each stator coil when the driving of the motor generator 100 is controlled by sinewave PWM control. The vertical line indicates a current [A] and the horizontal line indicates an electrical angle [°], which can represent a current phase. Each phase current Iu, Iv and Iw is generally in a sinewave form and is shifted 120[°] in phase in one cycle period 360[°] of waveform. A broken line shows a pre-shift current, which is a current before the phase shift and not phase-shifted, and a solid line shows a post-shift current, which is a current after the phase shift and phase-shifted. In FIG. 4, an amplitude of the current is assumed to be 40 [A].

Since the MGECU 14 performs the feedback control, the actual current value is near 0 [A] when the current command value is near 0 [A]. For this reason, when the current command value is near 0 [A], it is not clear whether the actual current value is near 0 [A] due to the disconnection even when the disconnection is actually present. In FIG. 4, for example, the current value of the W-phase current Iw becomes approximately 0 [A] at the electrical angle of 120[°]. It is thus not possible to detect the disconnection of the winding of the W-phase stator coil near the electrical angle 120[°].

For this reason, in a case that the locked state is determined at step S10, the phase shift request part 48 of the MGECU 14 checks whether any one of the current command values is in the predetermined disconnection undetectable range including the current value 0 [A]. That is, the shift request part 48 checks whether any one of the current phases is in the disconnection undetectable range. The processing of this step S12 corresponds to a current value check part. The disconnection undetectable range is set in accordance with the amplitude of each phase current Iu, Iv and Iw, for example, in view of noise and the like.

It is checked whether the absolute values of the current command values Idcom and Iqcom are less than a predetermined value. It is also possible to convert the current command values Idcom and Iqcom of the d-q coordinate system into values of the three-phase AC coordinate system and check whether any one of such values is in a disconnection undetectable range.

When it is determined at step S12 that there is a phase current, which is in the disconnection undetectable range, the current command correction part 32 of the MGECU 14 executes phase shift processing (S14). In the phase shift processing, the current command value is phase-shifted so that the direction of rotation of the motor generator 100 does not change and the current command value is outside the disconnection undetectable range (that is, inside a disconnection detectable range). The current command value of each phase is shifted by the same electrical angle thereby to suppress fluctuation of torque. The processing of this step S14 corresponds to a phase shift part.

Corrected current command values Idcomfix and Iqcomfix by correcting the current command values Idcom and Iqcom so the phase of the current command value of each phase is shifted by the electrical angle of 15[°], which is pre-stored in the memory as the phase shift amount. Thus as shown in FIG. 4, the phase of each phase current Iu, Iv and Iw is shifted by an electrical angle of about 15[°]. The phase shift amount is set so that the phase-shifted current command value of each phase is outside the disconnection undetectable range at, for example, electrical angle of 120[°] so that the phases of all three phases are shifted by the same electrical angle. Since the phase of each phase current Iu, Iv and Iw differs 120[°] from the preceding one, the phase shift amount may be set to satisfy 0[°]≤phase shift amount≤45[°].

After the phase shift processing, the MGECU 14 checks whether the winding of the stator coil has a disconnection based on a result of controlling the motor generator 100 with the phase-shifted current command value. The abnormality check part 50 of the MGECU 14 checks whether any one of the current phases has a difference larger than a predetermined value based on the d-axis difference ΔId and the q-axis difference ΔIq. In this checking, each of the d-axis difference ΔId and the q-axis difference ΔIq may be compared with a preset predetermined value. Alternatively, the d-axis difference ΔId and the q-axis difference ΔIq may be converted to three-phase AC coordinate system values and then a difference of each phase may be compared with a predetermined value. This processing of step S16 corresponds to an abnormality check part.

As described above, when the phase of the current command value of each phase is shifted by the amount of the electrical angle of 15[°], the actual current value of the phase-shifted W-phase current Iw at the electrical angle of 120[°] increases in comparison to the pre-shift current value as shown in FIG. 4 when the winding of the W-phase stator coil has no disconnection. As a result, when no disconnection is present, the difference of the W-phase does not change largely before and after the phase shifting. However, when a disconnection is present, the actual current does not follow the shifted current command value and the actual current value of the phase-shifted W-phase current Iw at the electrical angle of 120[°] becomes close to 0 [A]. Thus with the disconnection in the winding, the difference of the W-phase largely changes between pre-shifting and post-shifting of phase and the difference after the phase shifting takes a value larger than the predetermined value.

It is thus possible to check whether the disconnection is present based on the difference. When it is determined at step S16 that the disconnection arose, the MGECU 14 executes fail-safe processing (S18). As one example of the fail-safe processing, the MGECU 14 prohibits the motor generator 100 from being controlled. Further, the MGECU 14 outputs a disconnection detection signal to the HVECU 102 and the HVECU 102 responsively executes switching the travel mode over to an engine-driven mode, for example.

When it is determined that all of the differences are equal to or smaller than predetermined values at step S16, that is, the actual current value of each phase follows the current command value and no disconnection is determined to be present, all the processing is finished without executing the fail-safe processing of step S18. In this case, normal control is performed. For example, in the normal control, the phase shift request part 48 does not output the phase shift request θsftreq to the current command correction part 32 but outputs the current command values Idcom and Iqcom, which are not phase-shifted, as the current command values Idcomfix and the Iqcomfix. Thus the phase is shifted only in the period of disconnection detection.

When it is determined at step S10 that no locked state is present as well as it is determined at step S12 that no current phase is in the disconnection undetectable range, the step S16 and the following step is executed. For example, also in the case of no locked state, that is, the rotation speed of the motor generator 100 is high, when the disconnection is determined at step S16, the MGECU 14 executes the fail-safe processing. Further, also in the case that no current phase is in the disconnection undetectable range, when the disconnection is determined at step S16, the MGECU 14 executes the fail-safe processing. Thus, when the motor generator 100 is not only in the locked state but also in the non-locked state, the disconnection of the winding in the stator coil can be detected.

The MGECU 14 according to the present embodiment has the following advantages.

When the motor generator 100 is in the locked state and the current command value is in the disconnection undetectable range, the phase of the current command value is shifted so that the current command value is changed to the outside of the disconnection undetectable range without change of the direction of rotation of the motor generator 100. With this phase shifting, the current command value is changed to the outside of the disconnection undetectable range and the actual current value is outside the disconnection undetectable range when no disconnection is present. However, when the disconnection is present, the actual current value becomes close to 0 [A]. That is, a large difference arises between when the disconnection is present and when the disconnection is absent. It is thus made possible to check whether the disconnection is present based on the difference. Therefore, even when the motor generator 100 is in the locked state, it is possible to detect speedily the disconnection of the winding of the stator coil.

Further, it is checked whether the motor generator 100 has the disconnection in its winding based on the difference between the phase-shifted current command value and the actual current value caused in correspondence to the phase-shifted current command value. In this case, when the disconnection is present, the difference becomes large in the phase, in which the disconnection is present. It is thus possible to identify a particular phase having the disconnection among the plural phases. With identification of the particular phase of disconnection, it is possible to analyze the failure efficiently and reduce the number of components to be exchanged.

Further, when the motor generator 100 is in the locked-state and the current command value is in the disconnection undetectable range, the phases of the current command values of all phases are shifted by the same amount of electrical angles in the three-phase AC motor generator 100. With this shifting, the phase of each of the phase currents Iu, Iv and Iw is shifted by the angle of 120[°]. As a result, fluctuation of the drive torque can be suppressed.

Second Embodiment

In a second embodiment, description of the same parts as the MGECU 14 in the first embodiment will be omitted.

In the first embodiment, the phase of disconnection is identified by comparing the difference with the predetermined value at step S16. However, the phase of disconnection can be identified by other configurations.

Figure 5:
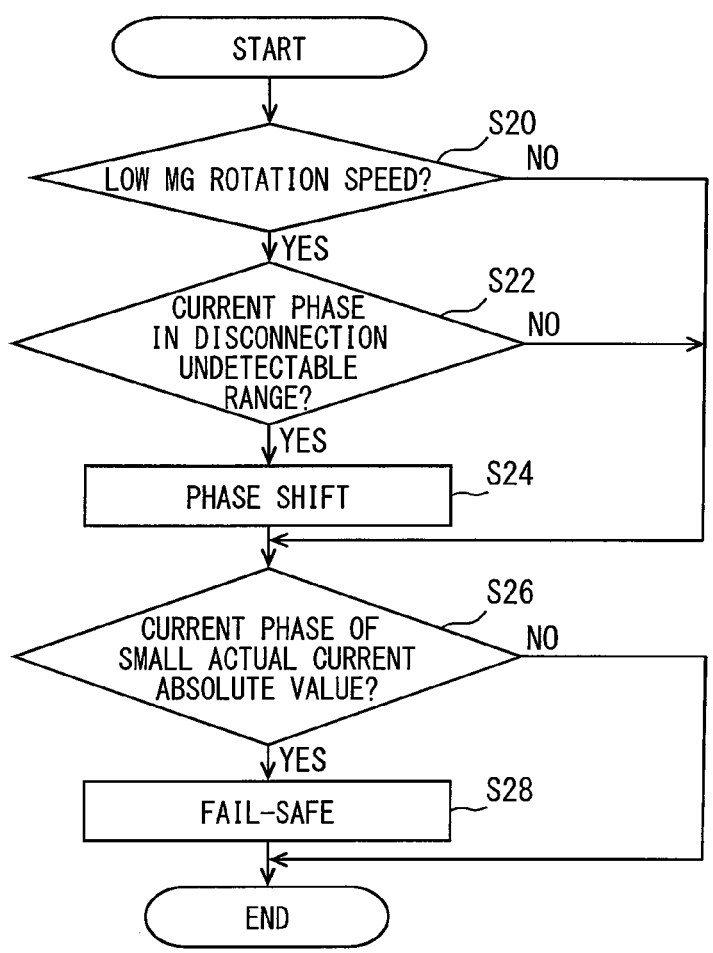
FIG. 5 is a flowchart showing abnormality detection processing of a MGECU according to a second embodiment.

In the second present embodiment, the MGECU 14 executes abnormality detection processing shown in FIG. 5.

Figure 3:
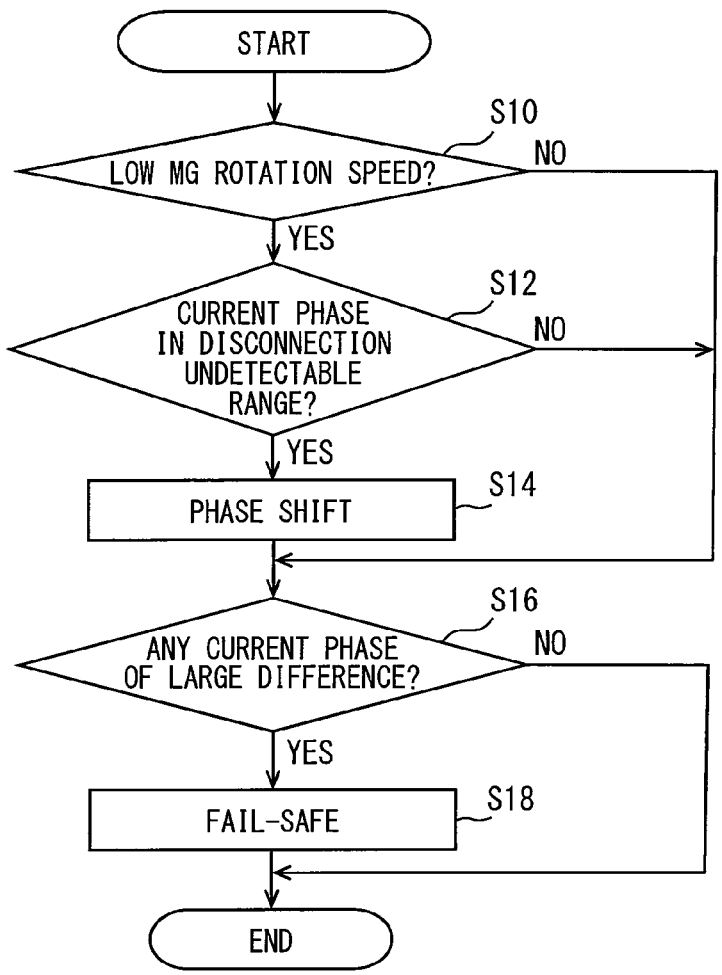
FIG. 3 is a flowchart showing abnormality detection processing of the MGECU.

FIG. 5 corresponds to FIG. 3 and steps S20, S22, S24 and S28 are the same as steps S10, S12, S14 and S18 of FIG. 3, respectively.

At step S26, which corresponds to step S16 in FIG. 3, it is checked whether any one of the current phases has an absolute value of the actual current value, which is lower than a predetermined value. The predetermined value is set to about 0 [A] in view of noise. The predetermine value defines the disconnection undetectable range described above.

In the second embodiment, similarly to the first embodiment, the current sensors 22 detect the actual current values of two phases (for example, U-phase and W-phase) of the stator coils. With respect to those two phases, it is possible to check whether the disconnection is present based on the detection signals of the current sensors 22. For example, even when the actual current value, which is before phase-shifted, is outside the disconnection undetectable range, the absolute value of the actual current value, which is after phase-shifted, is outside the disconnection undetectable range when no disconnection is present. It is therefore possible to check whether the disconnection is present based on whether the absolute value of the post-shift actual current value is smaller than the predetermined value.

With regard to the remaining one phase (V-phase), its actual current value is computed based on a relation that a sum of the three phase currents Iu, Iv and Iw is 0. It is possible to check whether the disconnection is present based on whether the absolute value of the computed phase-shifted actual current value is smaller than the predetermined value. For example, even when the current command value of the V-phase is determined to be in the disconnection undetectable range at step S22, the phase-shifted actual current value of the V-phase is computed and it is checked at step S26 whether the V-phase has the disconnection.

When it is determined at step S26 that any one of the current phase has the actual current value, the absolute value of which is smaller than the predetermined value, that is, it is determined that there is a disconnected phase, the MGECU 14 executes fail-safe processing (S28).

Thus even when the current sensors 22 are provided only in two phases, it is possible to identify which phase of the three phases has the disconnection. By thus identifying the phase of disconnection, it is possible to analyze the failure efficiently and reduce exchange of parts.

Third Embodiment

In a third embodiment, description of the same parts as the MGECU 14 in the first embodiment will be omitted.

As described in the first embodiment, the motor generator 100 includes the rotor made of permanent magnets. In the third embodiment, as one example, the motor generator 100 has a configuration, in which permanent magnets are implanted in a rotor. This implanted magnet type motor is referred as an IPM (interior permanent magnet) motor. In the motor generator 100 of the implanted magnet type, a reluctance torque is generated in addition to a magnet torque of the permanent magnets.

The magnet torque Trqm is generated by attraction and repulsion of the poles of rotating magnetic field and magnetic poles of the permanent magnets. The reluctance torque Trqr is generated by only attraction of the poles of the rotating magnetic field and the salient poles of the rotor. The magnet torque Trqm, the reluctance torque Trqr and a total torque thereof Trqall are expressed as the following equations (1) to (3).

$$Trqm = Pn \times \phi e \times Ie \times \cos\beta \qquad (1)$$

$$Trqr = Pn \times \tfrac{1}{2} \times (Lq-Ld) \times Ie^2 \times \sin 2\beta \qquad (2)$$

$$Trqall = Trqm + Trqr \qquad (3)$$

In the equations, Pn is a number of pole pairs of permanent magnets, φe is a magnetic flux density of the permanent magnets, Ld is a d-axis inductance, Lq is a q-axis inductance, Ie is a current (effective value of three-phase current) flowing in the stator coil, and β is a current phase angle. The current phase angle β is an angle of phase deviation of the rotating magnetic field relative to the magnetic flux of the rotor (phase angle of the current Ie relative to the q-axis).

Figure 6:
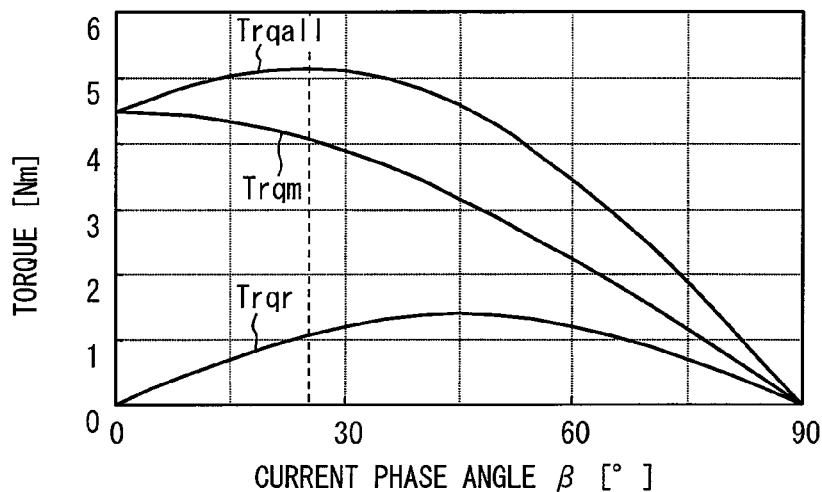
FIG. 6 is a chart showing a relation between a current phase angle and a torque.

FIG. 6 shows relations between the current phase angle β and each torque Trqall, Trqm, Trqr with a current amplitude being maintained at a constant value. The magnet torque Trqm is maximum at the current phase angle β of 0[°] and minimum at the phase angle of 90[°]. The reluctance torque Trqr is maximum at the current phase angle β of 45[°] and minimum at the current phase angle β of 0[°] and 90[°].

In the motor generator 100 of the implanted-magnet type, maximum torque current control, which maximizes torque generation relative to the same current, is performed so that torque is generated most efficiently relative to the current flowing in the stator coil. That is, each phase current is controlled at the current phase angle β, at which the total torque Trqall shown in FIG. 6 is maximum.

As described above, when the maximum torque current control is performed, the current phase angle β is also shifted by the electrical angle, which is the same as the phase shift. That is, the current phase angle deviates from the current phase angle β, at which the total torque Trqall is maximum. Therefore, when the current amplitude is constant, the drive torque provided by the motor generator 100 decreases. When this drive torque becomes smaller than a load torque required to ascend a slope, for example, the vehicle may descend backward on the slope.

Figure 7:
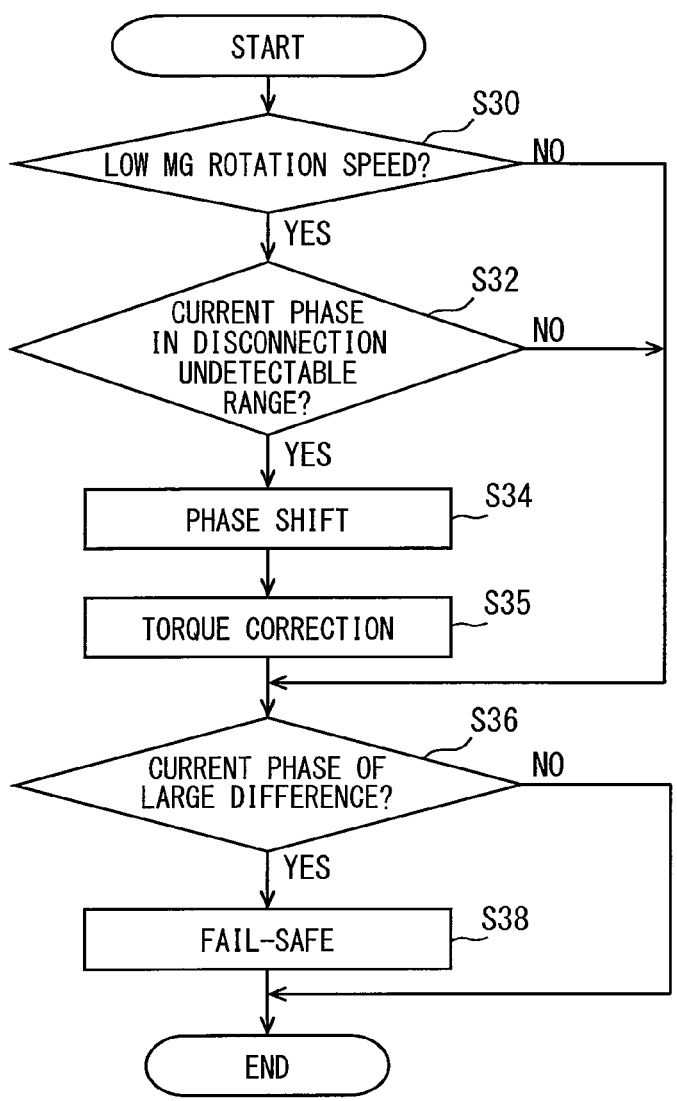
FIG. 7 is a flowchart showing abnormality detection processing of a MGECU according to a third embodiment.

In the third embodiment, therefore, the MGECU 14 performs torque correction processing on the current command value in addition to the phase shift processing performed in the first embodiment so that variation of torque caused by the phase shift is suppressed. FIG. 7 is a flowchart showing abnormality detection processing of the MGECU 14 in the third embodiment. FIG. 7 corresponds to FIG. 3 and steps S30, S32, S34, S36 and S38 are the same as steps S10, S12, S14, S16 and S18 of FIG. 3, respectively.

After finishing the phase shift processing shown in step S34, the MGECU 14 executes the torque correction processing on the current command value so that the variation of torque caused by the phase shift is reduced (S35). This step S35 corresponds to a torque correction part.

Figure 8:
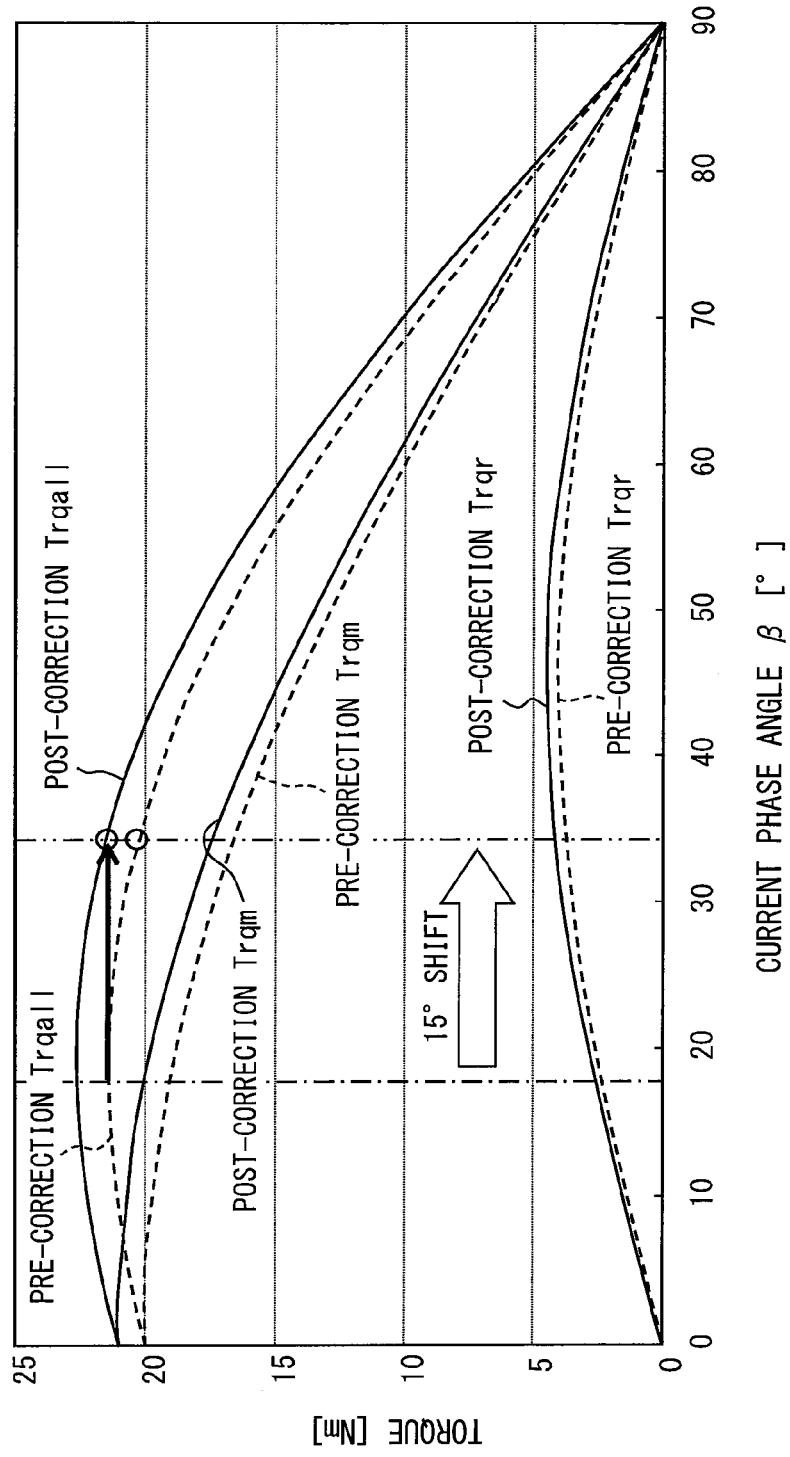
FIG. 8 is a chart showing torque correction.

FIG. 8 shows a relation between the current phase angle β and the torque. The relations before torque correction are shown with broken lines and the relations after torque correction are shown with solid lines. Before the phase shift, each phase current is controlled at the current phase angle β (one-dot chain line in the figure), at which the total torque Trqall is maximum. As a result, when the phase of each current command value is shifted by the electrical angle of 15[°] at step S34, that is, when the current phase angle β is shifted by the electrical angle of 15[°], the total torque Trqall after the shift (two-dot chain line in the figure) becomes smaller than the maximum value.

At step S35, as described above, the torque correction processing is executed on the current command value to minimize the variation of torque caused by the phase shift. As one example, the torque correction is performed so that the same torque may be maintained before and after the phase shift.

Figure 9:
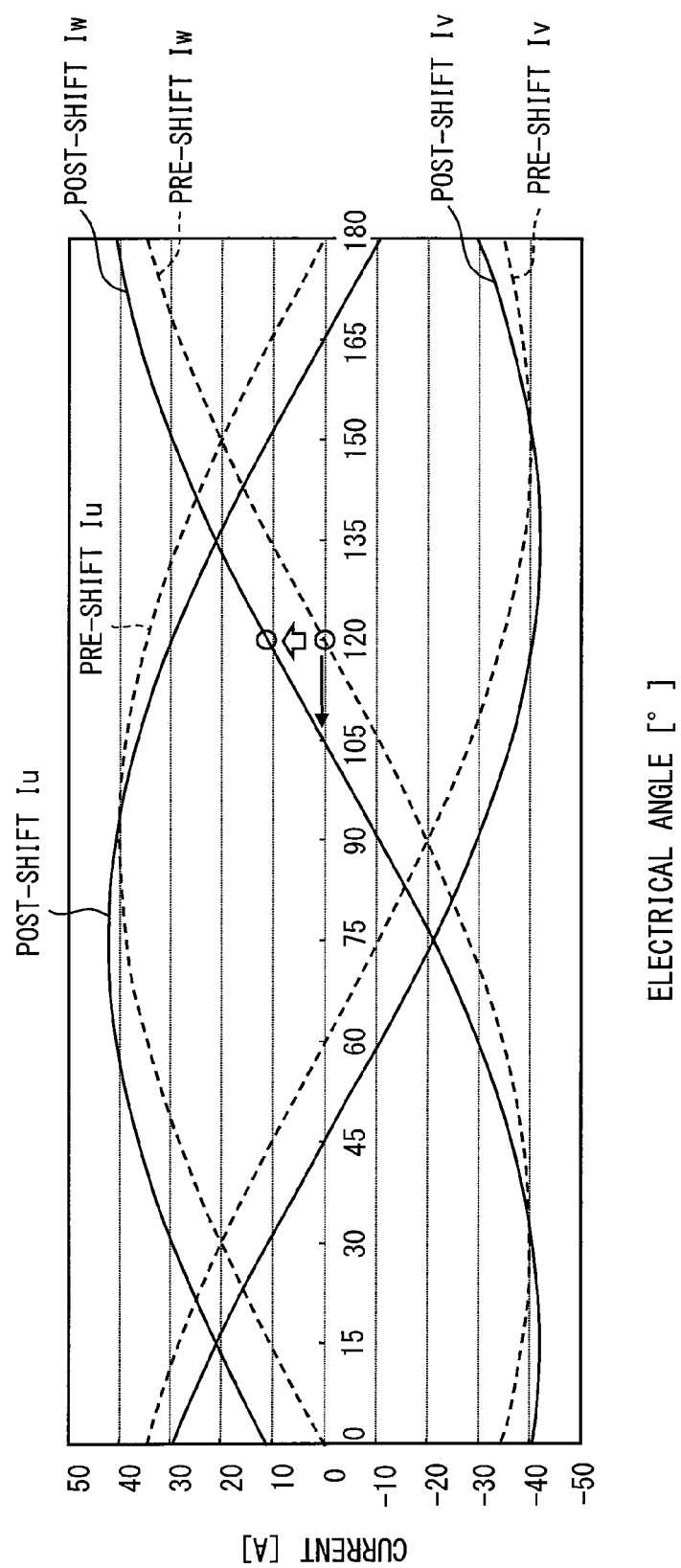
FIG. 9 is a chart showing a waveform of a current flowing to each coil before and after a phase shift.

Specifically, when the phase shift request θsftreq is inputted, the current command correction part 32 of the MGECU 14 determines the current Ie in the equations (1) to (3) so that the same torque may be produced before and after the phase shift. In this instance, the amplitude of the current Ie is increased than that of the pre-correction. For example, similarly to the first embodiment, as shown in FIG. 9, the post-shift current amplitude (solid line in the figure) after the phase shift and the torque correction is increased to be as large as 1.05 times of the pre-shift current amplitude of before the phase shift (broken line in the figure), assuming that the current amplitude before the phase shift is 40 [A]. Thus as shown by the solid line in FIG. 8, the post-correction total torque Trqall becomes equal to the maximum of the pre-correction total torque Trqall.

After the phase shift processing and the torque correction processing, the MGECU 14 checks whether the winding of the stator coil has the disconnection based on a result of controlling the motor generator 100 by using the current command value, which is phase-shifted and torque-corrected. Steps following step S36 are the same as in the first embodiment and the description thereof is omitted.

The MGECU 14 of the third embodiment provides the following advantages.

According to the third embodiment, in addition to the advantages of the first embodiment, the torque variation caused by the phase shift can be suppressed. As a result, it is possible to prevent the motor generator 100 losing the drive torque and prevent the vehicle from descending backward on the ascending slope.

Specifically, the torque is corrected to maintain the same torque before and after the phase shift. As a result, the torque variation is suppressed before and after the phase shift.

The motor generator 100 is configured to have the implanted-magnets. For this reason, as shown in FIG. 6, not only the magnet torque Trqm but also the reluctance torque Trqr are generated. As a result, a decrease of the torque caused by the phase shift can be reduced in comparison to a motor generator having a surface magnet configuration, in which the permanent magnets are fixed to the surface of the rotor. That is, the torque correction amount can be reduced to be small. However, the MGECU 14 described above can be applied to the motor generator of the surface magnet configuration, that is, a SPM (surface permanent magnet) motor. In this instance, the reluctance torque Trqr is 0.

The third embodiment is exemplified as the phase shift amount is predetermined and the current Ie is computed to correct the torque decrease caused by the phase shift. Alternatively, the current Ie for the torque correction may be predetermined and the electrical angle β and the phase shift amount may be computed so that the post-correction total torque value Tall equals the maximum value of the pre-correction total torque Trqall. That is, the order of steps S34 and S35 may be reversed.

Figure 10:
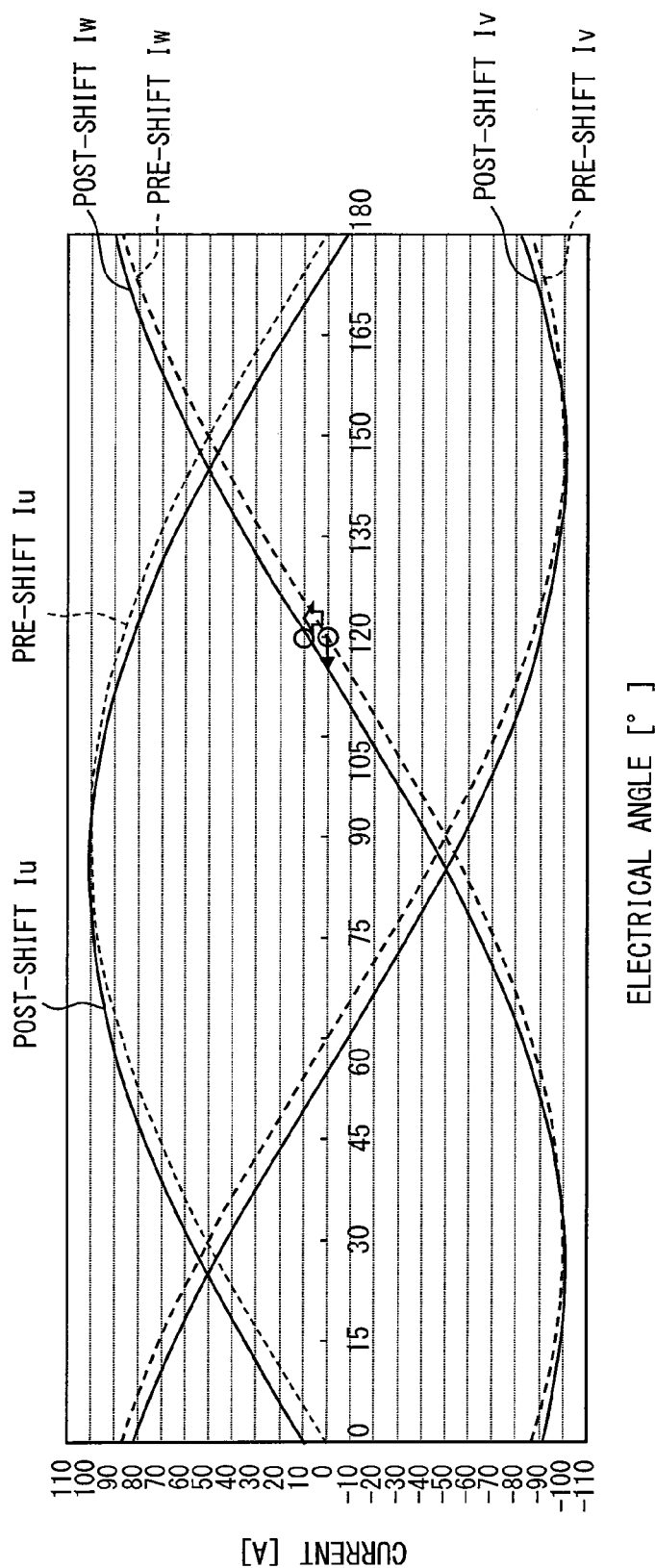
FIG. 10 is a chart showing a first modification example in correspondence to FIG. 9.

The phase shift amount and the torque correction amount are not limited to the above-described examples. In a first modification shown in FIG. 10, the current amplitude before the phase shift indicated by the broken line is set to 100 [A], the phase shift amount is set to the electrical angle of 5[°], the current amplitude and torque correction after the phase shift is set to be 1.01 times of those before the phase shift. Thus, for example, it is possible to detect the disconnection of the winding of the W-phase stator coil at the electrical angle of 120[°].

The phase may be varied with continuity by limiting a rate of phase variation, for example, so that large torque variation caused by the phase shift is suppressed.

The motor abnormality detection apparatus is described with reference to preferred embodiments. However, the apparatus is not limited to those embodiments but may be implemented differently.

The method of checking whether the stator coil has the disconnection in its winding is not limited to the above-described method. Any method may be used as far as it is based on a result of controlling the motor generator 100 by the current command value, which is phase-shifted. For example, the disconnection may be detected based on whether a rate of modulation is larger than a predetermined value. The rate is determined by dividing an output value Vd×cos θ+Vq×cos θ by the input value VBAT. However, when the rate of modulation is used, the phase of disconnection in the motor generator 100 of the three-phase AC type cannot be identified.

Figure 11:
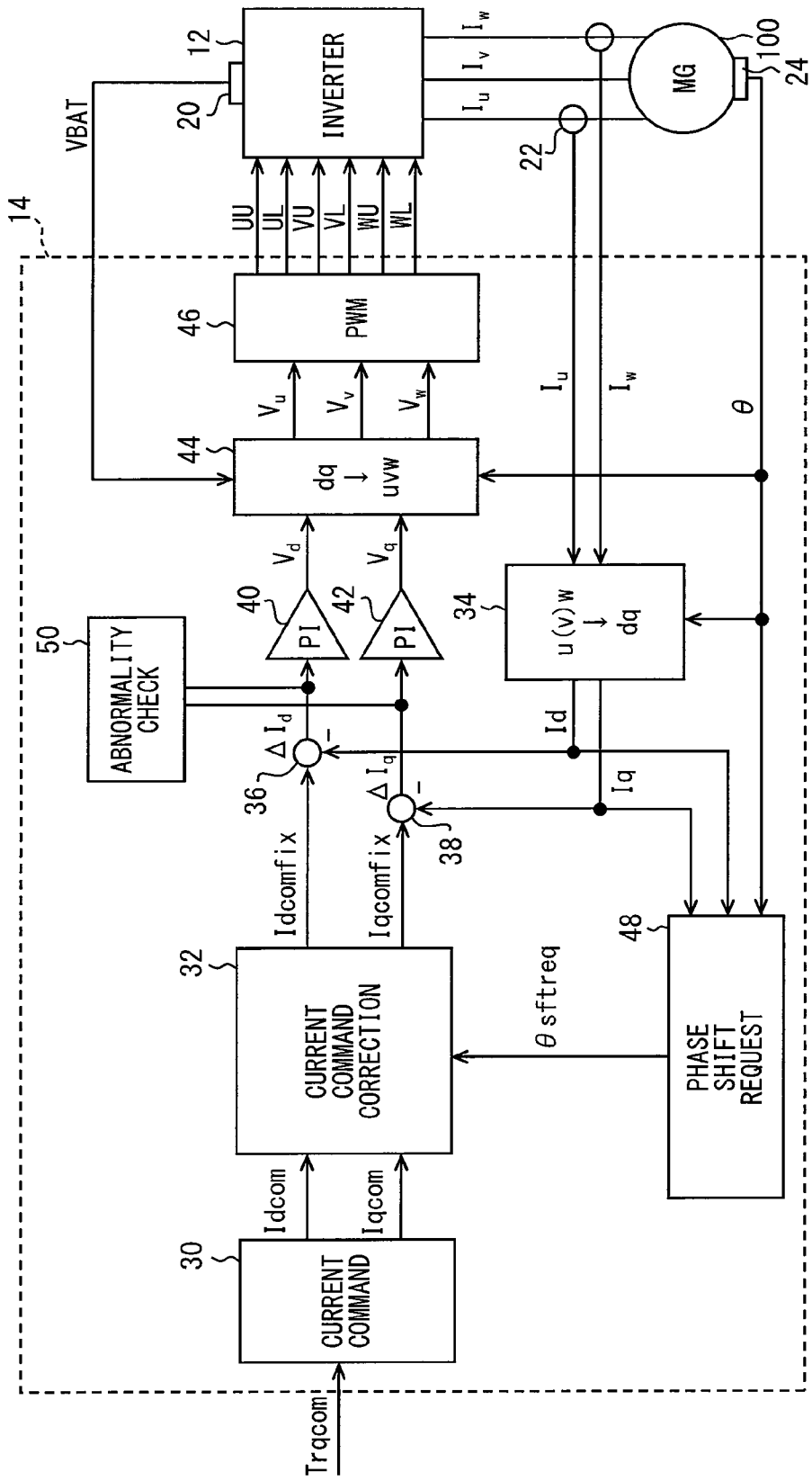
FIG. 11 is a circuit diagram showing a second modification example in correspondence to FIG. 2.

Further, other than the above-described method, the disconnection of the winding of the stator coil may be detected based on the actual current values, which are detected before and after the phase shift. For example, in a second modification shown in FIG. 11, the actual current values Id and Iq, which are coordinate-converted by the coordinate conversion part 34. That is, the actual current value is used to check whether there is any current phase in the disconnection undetectable range. For example, similarly to the second embodiment, the actual currents flowing in the stator coil of two phases (for example, U-phase and W-phase) may be detected and the actual current of the remaining one phase (V-phase) may be computed based on the relation that the sum of the three phase currents Iu, Iv and Iw is 0.

Figure 12:
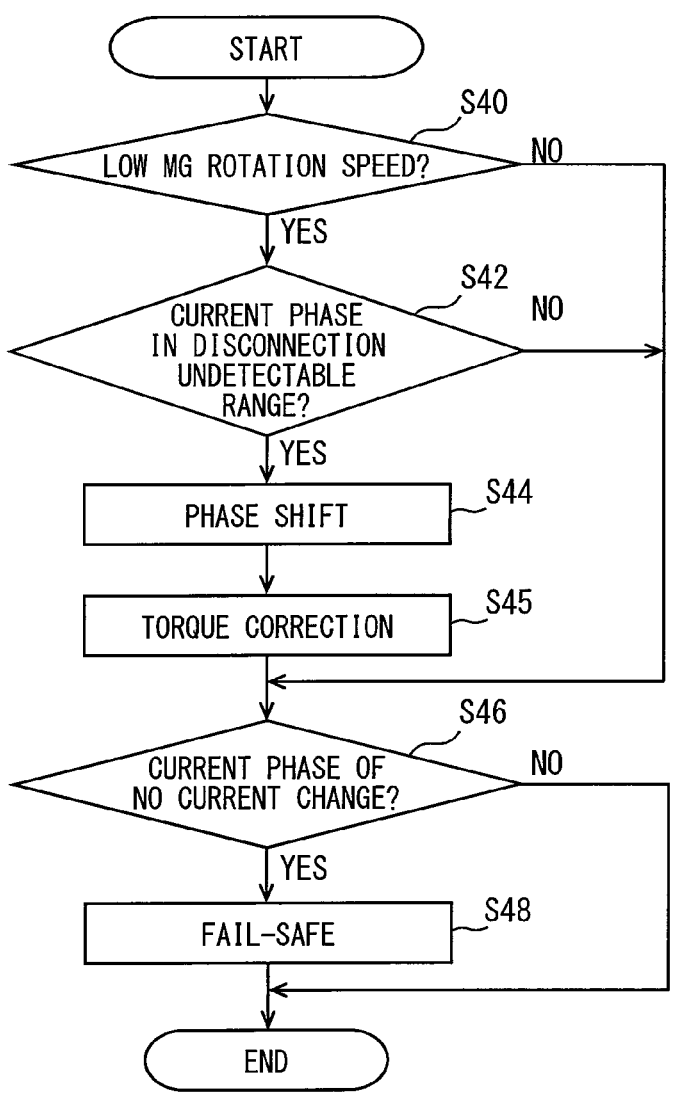
FIG. 12 is a flowchart showing abnormality detection processing in the second modification example.

In this case, the MGECU 14 executes processing shown in FIG. 12.

FIG. 12 corresponds to FIG. 7 and steps S40, S42, S44, S45 and S48 are the same as steps S30, S32, S34, S35 and S38 of FIG. 7, respectively. It is checked at step S46, which corresponds to step S36, whether there is any phase, in which the actual current value does not change before and after the phase shift. Here, the actual current value is determined to have no change in a case that the absolute value of the difference between the actual currents of before and after the phase shift is smaller than the predetermined value. When it is determined at step S46 that there is the current phase having no change in the actual current value, the MGECU 14 executes the fail-safe processing (S48).

In the above-described embodiments, the current sensors 22 are exemplified as being provided in two phases among three phases of the motor generator 100. However, the current sensors 22 may be provided in all three phases. In this case, the current sensor 22 corresponds to each phase. Based on the actual current value detected by each current sensor 22, the disconnection can be detected and the phase of disconnection can be identified.

In the above-described embodiments, the locked state is determined when the rotation speed of the motor generator 100 is lower than the predetermined value. The locked state may be detected differently. For example, the motor generator 100 may be determined to be in the locked state when the torque command value Trqcom is larger than a predetermined value. Alternatively, the motor generator 100 may be determined to be in the locked state when a carrier frequency of the PWM is lower than a predetermined value.

The motor generator 100 is exemplified as functioning a motor and a generator. However, it is only necessary to function as at least a motor. Although the motor generator 100 is exemplified as the three-phase motor generator, the number of phases is not limited. The number of phases may be single or multiple other than three.

Although the three-phase AC motor generator 100 is vector-controlled, it is not limited to the vector control.

The motor abnormality detection apparatus is not limited to the MGECU 14 of a hybrid vehicle. It may be implemented in a MGECU of an electric vehicle. It may also be implemented for a motor other than a vehicle.

What is claimed is:

1. A motor abnormality detection apparatus for detecting a disconnection of a winding of a motor, which is feedback-controlled based on a current command value required for the motor to generate a predetermined torque and an actual current value flowing to the winding of the motor, the motor abnormality detection apparatus comprising:
    a locked state check part for checking whether the motor is in a locked state;
    a current value check part for checking whether a current value, which is the current command value or the actual current value, is in a disconnection undetectable range including a current value of zero;
    a phase shift part for shifting, when the motor is determined to be in the locked state and the current value is determined to be in the disconnection undetectable range, a phase of the current command value so that the current command value is outside the disconnection undetectable range with a direction of rotation of the motor being unchanged; and
    an abnormality check part for checking whether the winding of the motor has a disconnection based on a result of control of the motor with a phase-shifted current command value.

2. The motor abnormality detection apparatus according to claim 1, further comprising:
    a torque correction part for performing torque correction to suppress variations in torque caused by phase shift of the current command value,
    wherein the abnormality check part checks whether the winding of the motor has the disconnection based on the result of control of the motor with a phase-shifted and torque-corrected current command value.

3. The motor abnormality detection apparatus according to claim 2, wherein:
    the torque correction part performs the torque correction on the current command value so that the torque is unchanged between before and after the phase shift.

4. The motor abnormality detection apparatus according to claim 2, wherein:
    the motor is an IPM motor.

5. The motor abnormality detection apparatus according to claim 1, wherein:
    the motor is a three-phase motor;
    the current value check part checks whether the current value is in the disconnection undetectable range in any one of three phases of the motor; and
    the phase shift part shifts, when the motor is determined to be in the locked state and the current value of any one of the three phases is determined to be in the disconnection undetectable range, the phase of the current command value of each phase by a same amount of electrical angle so that the current command value of each phase is outside the disconnection undetectable range with the direction of rotation of the motor being unchanged.

6. The motor abnormality detection apparatus according to claim 1, wherein:
    the abnormality check part checks whether the winding of the motor has the disconnection based on a difference between a phase-shifted current command value and the actual current value flowing in response to the phase-shifted current command value.

7. The motor abnormality detection apparatus according to claim 5, wherein:
the abnormality check part checks, based on a sum of the actual current values flowing in two of the three phases of the motor, whether a remaining one phase of the motor has the disconnection.

* * * * *